(12) United States Patent
Loveland et al.

(10) Patent No.: US 8,627,475 B2
(45) Date of Patent: Jan. 7, 2014

(54) EARLY DETECTION OF POTENTIAL MALWARE

(75) Inventors: Shawn D. Loveland, Sammamish, WA (US); John J. Lambert, Redmond, WA (US); Darren E. Canavor, Redmond, WA (US); Ryan C. Colvin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 12/757,018

(22) Filed: Apr. 8, 2010

(65) Prior Publication Data
US 2011/0252476 A1    Oct. 13, 2011

(51) Int. Cl.
*G06F 11/00* (2006.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| | | | |
|---|---|---|---|
| 8,266,243 B1 * | 9/2012 | Carlson et al. | 709/217 |
| 8,266,715 B2 * | 9/2012 | Lee | 726/30 |
| 2006/0070130 A1 | 3/2006 | Costea et al. | |
| 2006/0253583 A1 | 11/2006 | Dixon et al. | |
| 2007/0061877 A1 * | 3/2007 | Sima et al. | 726/12 |
| 2007/0113281 A1 | 5/2007 | Leach | |
| 2007/0162975 A1 | 7/2007 | Overton et al. | |
| 2007/0186284 A1 * | 8/2007 | McConnell | 726/25 |
| 2008/0086773 A1 * | 4/2008 | Tuvell et al. | 726/23 |
| 2008/0163374 A1 * | 7/2008 | Rogers et al. | 726/25 |
| 2008/0244748 A1 | 10/2008 | Neystadt et al. | |
| 2008/0256619 A1 | 10/2008 | Neystadt et al. | |
| 2009/0320136 A1 | 12/2009 | Lambert et al. | |

OTHER PUBLICATIONS

"Massive Spam Run Propagates Critical Fuclip Trojan", Retrieved at <<http://www.eset.com.sg/html/86/446/>>, dated Jan. 20, 2007, 1 page.
Lawrence, Eric, "IE8 Security Part III: SmartScreen® Filter", Retrieved at <<http://blogs.msdn.com/ie/archive/2008/07/02/ie8-security-part-iii-smartscreen-filter.aspx, dated Jul. 2, 2008, p. 1-13.

* cited by examiner

*Primary Examiner* — Teshome Hailu (57) ABSTRACT

Evidence of attempted malware attacks may be used to identify the location and nature of future attacks. A failed attack may cause a program to crash. Crash data may be sent to an analyzer for analysis. The analysis may reveal information such as the identity of the program that is being exploited, the specific way in which the program is being exploited, and the identity or location of the source of the attack. This information may be used to identify potential sources of attack and to identify the same type of attack from other sources. When the source and/or nature of an attempted attack is known, remedial action may be taken. Filters may warn users who are attempting to visit sites from which attacks have been attempted, and the makers of programs that are being exploited can be notified so that those program makers can release updates.

20 Claims, 6 Drawing Sheets

EARLY DETECTION OF POTENTIAL MALWARE

BACKGROUND

Malware is an ever-present threat in a computing landscape in which devices are connected to each other. Attackers with various motives seek to propagate malicious software. The damage inflicted by malicious software can range anywhere from minor annoyance to widespread catastrophic system failures. Thus, many resources are devoted to protecting computers and other devices from malware attacks.

Protection against malware takes many different forms, which reflects the fact that there is a large number of different ways to mount an attack. For example, popular products such as free document readers and browser plug-ins are common attack vectors. Thus, the makers of these products update their products to resist attacks when the attacks have been discovered. Likewise, operating systems may provide opportunities for attack, and the makers of operating systems regularly provide updates to resist known attacks. Virus detectors monitor systems for behaviors that are known to be associated with viruses (e.g., certain types of buffer overflows that serve as attack vectors to install viruses). These virus detectors also monitor for the presence of files that have been known historically to be associated with malware.

However, these techniques are mainly based on detecting and preventing successful attacks that have already been observed with a fairly frequent occurrence. For example, if a successful virus attack has been launched and detected "in the wild," a virus detector can be updated to recognize the signature of that particular virus. If a browser plug-in has been used for an attack, the maker of that plug-in can analyze the attack and update the plug-in to resist that type of exploit. If the overflow of a particular buffer is known to have been used as part of an attack, then the measure of watching the buffer to see if it overflows can be used to detect other attacks. But these techniques are based on the assumption that future attacks will look like past attacks that have succeeded.

SUMMARY

Malware attacks, and other types of attacks, can be detected proactively by observing evidence of failed attacks. For example, a failed attack may cause a program to crash. Crash data may be sent to an entity that performs analysis on the crash. (The crash data may be sent anonymously in order to protect the privacy of users who volunteer to send crash data.) In one example, the entity that performs crash analysis may be a manufacturer of an operating system on which the crashed program was running, although any entity could perform the crash analysis.

Crash data is normally analyzed to identify bugs in the program that crashed, or bugs in the operating system under which the program is running. However, that crash data may also provide details suggesting that the crash was the result of an attempted attack, and may provide details about how the attack attempt arose. For example, a browser may crash when a user is visiting a particular web site. The crash data may contain the identity of the web site and/or that of any particular plug-in that the user was using at the time of the crash. The nature of the crash may reveal the details of the method of attack the cybercriminal has developed and may be in the process of testing or pushing out into the wild—e.g., an attempt to overflow a buffer, an attempt to write to hard memory locations, etc. Thus, the crash data also contain details on where the attack originated on the Internet, thereby giving the location of attacks that have yet to be detected. That is, the data suggest that a particular web site might be the source of future attacks, and that these attacks might try to exploit vulnerabilities in a particular plug-in or another method of attack unrelated to the detected attack.

When a possible source and/or mode of attack has been identified, various actions can be taken. For example, if a particular web site has been identified as the source of an attempted attack, a crawler can visit the web site to determine what other type of attacks might be present on that site. Or, if a particular plug-in has been used in a failed attack, the maker of that plug-in can be warned of the attempted attack so that it can provide an update. Then, users can be advised to install the update. Other scenarios are possible. For example, an attack might come through an online advertisement that is presented on an otherwise legitimate web site. If the advertisement is displayed during a crash, then an examination can be made of the advertisement and its source. Then, the party that provides the advertising for the legitimate web site can be advised that its advertisements are possibly being used to host an attack. The foregoing are merely some example ways that information about attempted attacks could be used. There are many additional examples of how such information could be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Malware is an ever-present threat in a networked computing environment. For as long as computer networks have existed, there have been people who seek to create attacks on other people's computers. Attackers engage in these types of attacks for various reasons: profit, thrill, notoriety, a sense of power, or any other reason. Attacks propagate from machine to machine when the machines exchange information. Thus, as the number of devices that are connected to each other through the internet increases, the potential for attacks increases as well. In the past, computers were the main types of machines that were connected to each other through networks. Now, many other types of machines—e.g., music players, kitchen appliances, home entertainment devices, cars, etc.—are online, which increases the potential for attacks.

Traditionally, malware has been detected retrospectively. That is, once a successful attack has been launched, the particular files or other data associated with the attack, and the way in which those files propagate, can be analyzed. For example, if a virus has been observed "in the wild" attacking a large number of computers, the particular form of data (e.g., an executable file) through which the virus is carried can be identified. Moreover, the way in which that file propagates can be discovered. (E.g., the attack might propagate through a socially-engineered e-mail attack in which users are encouraged to open the file, or through a "drive-by" attack in which a weaponized web site installs malware on a machine that visits the site.) Remedial measures then can be taken. The file can be added to a database of known viruses, and a machine's anti-virus software can canvass the machine to detect the presence of the file. E-mail filters can be updated to recognize e-mails that carry the virus. Moreover, the virus might attack its target machine through a particular mechanism (e.g., by overflowing a buffer, by poking specific values into memory locations that are reserved for executable code, etc.). In this case, malware detectors can look for use of that mechanism in unknown programs in order to detect instances of new malware that perform attacks using these mechanisms that have been successful in the past.

These measures to prevent malware have been valuable, but what they have in common is that they try to detect future attacks by detecting data and behaviors that have been associated with past attacks. However, it is likely that many future attacks will not look like past attacks. Therefore, in some cases, resisting an attack may depend on being able to identify the source or mode of attack before a successful attack is actually made. The subject matter described herein may be used to detect attacks, or attempted attacks, before they become successful.

The subject matter described herein draws on the observation that malware—like other types of software—is developed and tested incrementally. It is difficult to write beneficial software that performs as expected on the first try. Malevolent software is no different. Software typically has to be written, tested, debugged, re-tested, etc., until it is ready to be deployed. Commercial software normally undergoes much of its testing in a closed environment before a version of the software becomes widely available. With malware, however, the software is often tested through deployment. The attacker deploys a version of the malware; if the malware fails to produce the intended attack, then the attacker modifies the malware and tries again. These failed attacks may leave clues about what types of malware are under development, where the malware might come from, and what sort of vulnerability is being exploited to propagate the malware. Often, these clues are left behind when the attempted attack causes a program to crash.

Many types of attacks are leveled through other programs. For example, a web site might be weaponized to exploit a vulnerability in a particular web browser, or a particular plug-in or ACTIVEX control for that browser. The attacker might want the weaponized page to use the browser to cause some form of damage to the host computer. However, before the attackers successfully develop malware that can produce that damage, a nascent version of the malware might cause the browser to crash. When a program crashes, crash data (e.g., a memory image of the process in which the crash occurred) may be stored on the computer where the crash occurred. Operating system (OS) manufacturers are often interested in analyzing crash data, since crash data may allow the OS manufacturer to learn whether the crash was caused by a bug in the operating system. Thus, OS manufacturers often ask users for permission to upload their crash data, in order to help the OS manufacturer detect and remedy the source of the crash. However, in addition to helping the OS manufacturer remedy an issue with the OS, the crash data may also reveal an attack under development. For example, a failed attack may use techniques that are known to have been used with successful attacks—e.g., attempting to induce buffer overflows, poking values into specific memory locations, etc. Additionally, the crash data may reveal what location on the internet provided the code that caused the crash, what plug-ins were active in the browser at the time of the crash, etc. This information may suggest to an OS manufacturer (or any other entity that collects crash data) what kinds of attacks are being developed, and where the potential attacks are coming from.

For example, suppose that a browser crashes when the user is viewing a well-respected news web site. It is unlikely that a respected news provider would weaponize its web site, but such sites often serve ads that are provided by third-party advertising services. These third-party advertising services place ads from numerous sources large and small, and it is possible that one such source has attempted to place a weaponized ad. The crash data are likely to reveal the sources of all content that was being viewed at the time of the crash—both the URL of the main web site, and the URLs of any other content that might have been referenced on that page. Thus, analysis of the crash data may suggest that an attack is being developed through weaponized ads, and may also indicate where the attack is coming from and what ad is hosting the attack. Once the source of the attack is determined, web sites associated with that source can be analyzed to determine other possible attacks that may exist on undiscovered pages on the Internet. Moreover, the relevant parties can be alerted to the fact that an attack is under development. For example, the ad placement service can be notified that one of its customers appears to be attempting to launch an attack through a weaponized ad. If the ad is attempting to use a particular browser plug-in as part of the attack (a fact which might be detectable through crash data), then the maker of that plug-in can be warned and encouraged to release an update. Moreover, once the update is available, users can be encouraged to install the update. Additionally, other mitigation efforts can be put in place until the update is available and the user installs the update.

Various other scenarios are possible. For example, if crash data shows that an e-mail was opened right before a crash, this fact may suggest a socially-engineered attack that propagates by encouraging users to open links contained in e-mail. The foregoing are merely some example scenarios of how failed attacks could be used to detect and prevent future attacks. Additional ways to use information about attempted attacks are described below.

Figure 1:
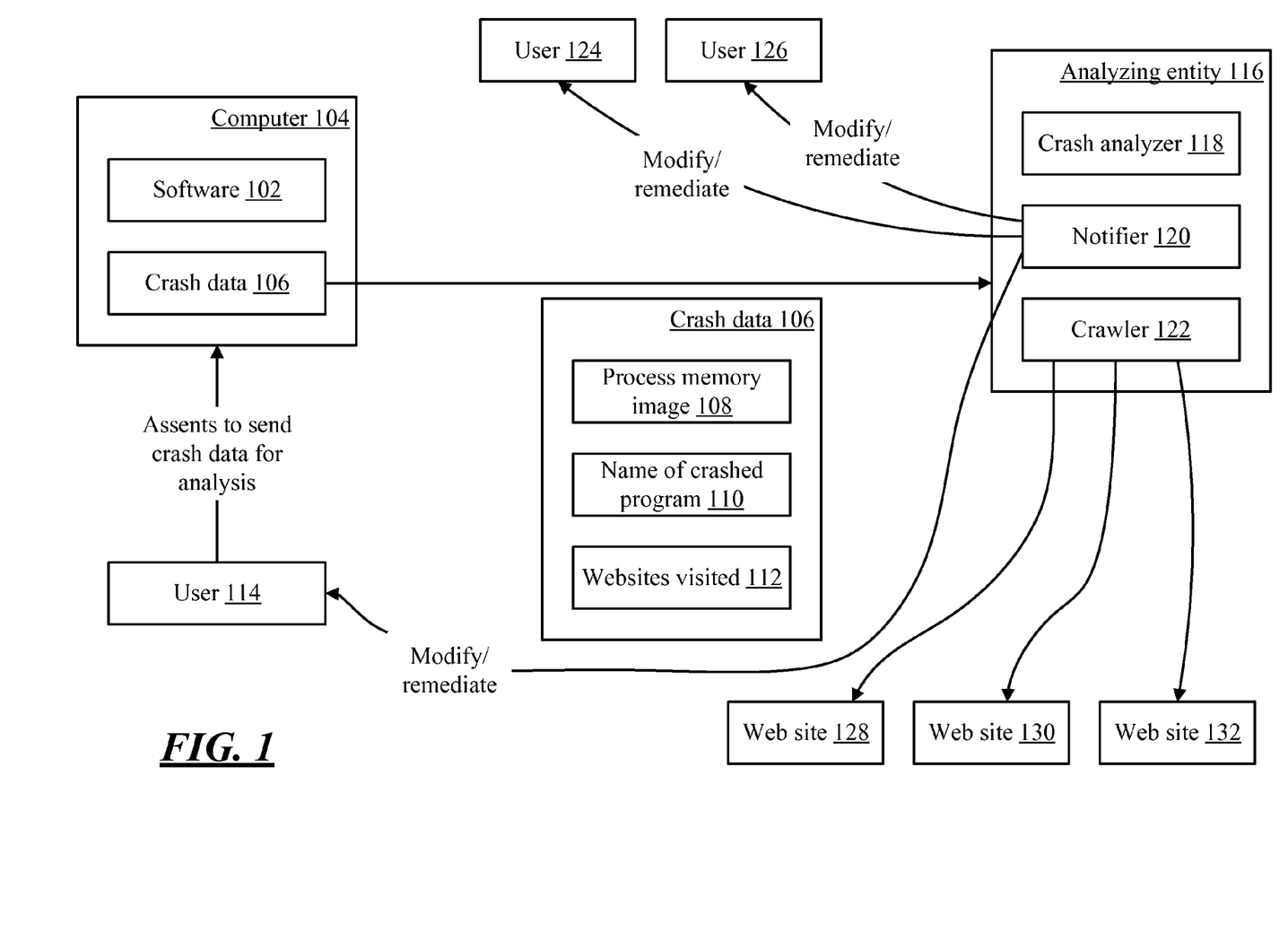
FIG. 1 is a block diagram of an example scenario in which crash data is used to detect potential threats.

Turning now to the drawings, FIG. 1 shows an example scenario in which crash data is used to detect potential threats. In the example of FIG. 1, software 102 executes on computer 104. Software 102 may be any type of software. For example, software 102 may be a web browser, a word processor, a media player, an e-mail client, a viewer for Portable Document Format (PDF) documents, or any other type of software. Computer 104 may be any type of computer such as a desktop computer, a laptop computer, a handheld computer, a smart phone, or any other type of device that has the ability to execute some type of software 102.

At some point while software 102 is running, software 102 crashes. An operating system present on computer 104 may cause crash data 106, concerning a crashed program, to be generated and stored. For example, crash data 106 may include an image 108 of the process in which software 102 was running at the time of the crash. As another example, crash data 106 may include the name 110 of the program that crashed. As another example, crash data 106 may include the name and/or network address of web sites 112 that were being visited at the time of the crash. Software 102 may be a program that obtains data from other locations (e.g., a web browser, document reader, or media player that renders content obtained from a web site). Since threats often enter a computer from a network location, it may be of interest to know what web sites or other network locations the computer was visiting and/or receiving data from at or near the time of the crash, so such information may be recorded as part of crash data 106.

When computer 104 generates crash data 106, that crash data may stay on computer 104. The crash data may contain private information relating to the usage of computer 104, and thus a user might choose not to send the crash data anywhere. However, many users do choose to send their crash data to another entity. For example, the manufacturer of the OS for computer 104 may request that the user send crash data, so that the OS manufacturer can analyze the conditions that led to the crash, and can possibly make the OS more resistant to future crashes. Thus, user 114 of computer 104 may choose to send crash data 106 to an analyzing entity 116 (where analyzing entity 116 may be an OS manufacturer, but could be any entity). If user 114 assents to have crash data 106 sent to analyzing entity 116, then crash data 106 may be sent to that analyzing entity.

Analyzing entity 116 may employ various components to analyze and react to crash data 106. For example, analyzing entity 116 may include a crash analyzer 118 that examines the information contained in crash data 106, and attempts to determine what it can about the crash. For example, crash analyzer 118 may examine the memory image 108 to determine the immediate cause of the crash—e.g., stack overflow, memory fault, attempted use of privileged instructions, etc. Additionally, crash analyzer 118 may attempt to learn what the program was doing at the time of the crash. For example, if the program is a web browser, then the name and Uniform Resource Locator (URL) of a web site that was being displayed at the time of the crash may be discernible from crash data 106. If a particular plug-in or ACTIVEX control was active at the time of the crash, this fact may be evident in crash data 106. As another example, the particular types of actions that were being performed at the time of the crash may be evident from crash data 106. In this way, it is possible to learn something about what was happening in the program at the time of the crash. While this type of analysis is often used to detect bugs in the program and/or the operating environment, analysis may also be used to detect an attempted exploit and the specific mode of the exploit. For example, suppose that the program that crashed is a browser. Further suppose that, at the time of the crash, the browser had loaded a page containing an ad that is hosting an exploit located on bad.example.com, and was processing information in the web page using a particular version of the Flash plug-in. These facts may suggest that an attacker is attempting to exploit a vulnerability in the Flash plug-in as a way to attack computers. Crash analyzer 118 could detect this type of fact from crash data 106.

In addition to analyzing crash data 106, analyzing entity 116 may perform various other functions. For example, analyzing entity may notify other entities of potential vulnerabilities and potential sources of malware, or may use the information that it has found to investigate potential sources of malware further. Thus, analyzing entity 116 may use notifier 120 and/or a crawler 122. Notifier 120 performs various different types of notifying functions. For example, notifier 120 may notify users (such as users 124 and 126, as well as user 114) of potential dangers. For example, if analysis of crash data 106 reveals that the web site bad.example.com is hosting a "drive-by" attack that exploits a vulnerability in Flash, then notifier 120 may notify users that bad.example.com is a dangerous web site. For example, notifier 120 could update a database of dangerous web sites, and browsers could be configured to check this database when retrieving web pages. Once bad.example.com has been verified as a dangerous web site, browsers could warn users of the danger before retrieving pages from bad.example.com. Another example of notification that could be performed is that the manufacturer of the software used in the attack (e.g., Flash, in this example) could be notified that an attackers is trying to develop an attack that exploits that manufacturer's software. If the manufacturer is notified, then the manufacturer could take remedial action (e.g., the manufacturer could release an update to the software that is resistant to the type of attack that is being attempted).

Additionally, analyzing entity 116 may employ crawler 122 to investigate web sites that have been identified as possible sites of attack, or to look for newly discovered attacks on other web sites. For example, suppose that it has just been discovered (through crash analysis) that bad.example.com is attempting to launch an attack. It may be reasonable to assume that if bad.example.com is trying to launch one attack, then it might be hosting other types of yet-undiscovered malware/attacks. Thus, crawler 122 can visit bad.example.com to see what types of files or other information are being stored on that web site, and the information that is discovered can be analyzed. Additionally, once a potential attack coming from bad.example.com has been discovered, it may be reasonable to assume that bad.example.com is not the only place that such an attack might be launched from. Thus, crawler can visit other web sites 128, 130, and 132 to determine whether these web sites might be hosting similar activity. It is noted that web sites 128-132 might be web sites that are known to be legitimate. However, legitimate web sites can become infected in various ways (e.g., through advertising content that is placed by a third-party). Thus, once a nascent attack originating from bad.example.com has been discovered, it may be reasonable to examine legitimate web sites to detect legitimate channels through which bad.example.com might launch an attack.

It is noted that the "attack" referred to above may be an unsuccessful attack. Successful malware often does damage without causing a crash. However, when the malware is in the developmental stage, the crash provides an opportunity to detect a particular source and mode of attack. Thus, when the malware developer produces the successful version of the malware, something may be known about the techniques that this malware will use to cause damage, and/or the source of the malware, and/or the particular exploit through which the malware will attack a machine. Thus, it may be possible to guard against future successful attacks by using information about failed attacks that is revealed in crash data.

Figure 2:
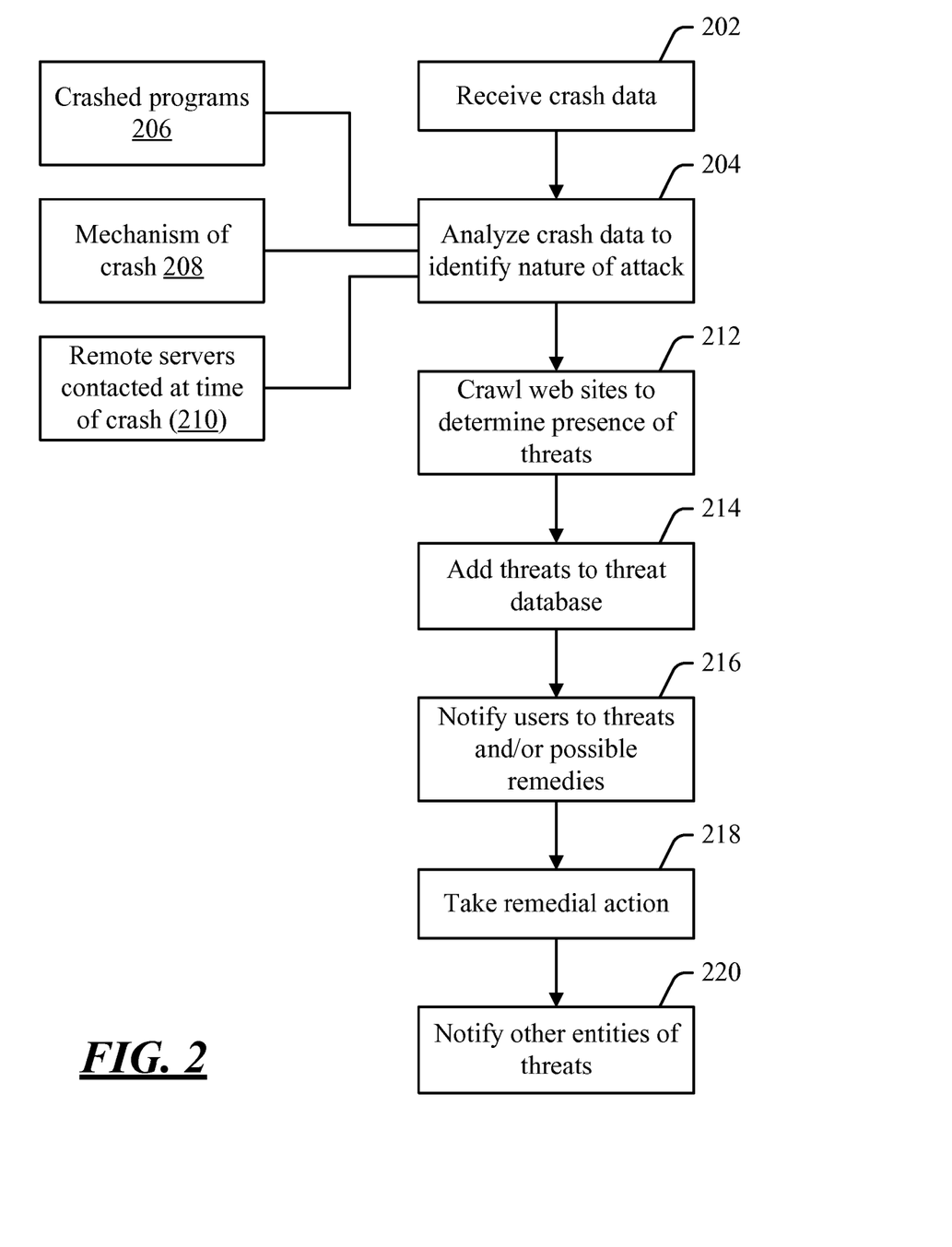
FIG. 2 is a flow diagram of an example process in which crash data may be used to detect potential malware.

FIG. 2 shows an example process in which crash data may be used to detect potential malware. Before turning to a description of FIG. 2, it is noted that the flow diagram contained in FIG. 2 is described, by way of example, with reference to components shown in FIG. 1, although this process may be carried out in any system and is not limited to the scenario shown in FIG. 1. Additionally, the flow diagram in FIG. 2 shows an example in which stages of a process are carried out in a particular order, as indicated by the lines connecting the blocks, but the various stages shown in this diagram can be performed in any order, or in any combination or sub-combination.

At 202, crash data is received. Crash data may be received by a maker or distributor of the program that crashed, or a maker or distributor of the operating system under which the program that crashed was running, or by any other entity. The entity that receives the crash data may be the analyzing entity 116 (shown in FIG. 1), but could be any entity.

At 204, the crash data is analyzed. Analysis of the crash data may reveal information such as the identity of the crashed programs (and any programs, such as plug-ins and/or ACTIVEX controls that may have been running in connection with the crashed program) (block 206). Analysis of the crash data may also reveal the particular mechanism of the crash (e.g., stack overflow, memory fault, attempted use of privileged instructions, etc.) (block 208). Additionally, analysis of the crash data may reveal what remote servers were being contacted at the time of the crash (block 210). For example, if a program such as a browser is loading page from a particular web site at the time of the crash, that fact may suggest that the attack is coming through the page that is being loaded. The fact that the attack is coming through that page may not be the fault of the provider of the page. For example, the page might have third-party ads, and the attack might be coming through an ad that is served with the page. However, the identity of the page that is being loaded (and the server that is providing that page) may provide clues about where an attempted attack is coming from, and these clues may be used to guard proactively against a successful future attack. (E.g., analysis of the data may reveal that, at the time of the crash, the user was visiting news.example.com, which was hosting an ad from ad.example.com, which is hosting a drive-by malware attack from bad.example.com. Moreover, in addition to identifying URLs, IP addresses could also be identified in the crash data.)

When particular sources of attack, such as particular web sites, have been identified, these web sites may be crawled to determine the presence of threats (at 212). For example, if analysis of the crash data reveals that a user was loading a page from a particular web site at the time of a crash, that web site may be crawled to determine what other malware is present or linked on that site. In addition to crawling sites where malware is detected, other sites may also be crawled to see if those other sites are hosting or linking to the detected threat. For example, an attempted attack may have been discovered on the web site bad.example.com. That web site can be crawled to determine what sort of malware is being hosted or linked by that site. However, once the attempted attack by bad.example.com has been discovered, other web sites can be crawled to determine whether they are hosting the same attack.

When sites have been crawled to discover the presence of malware threats, these threats may be added to a threat database (at 214). The database of threats may be used in various ways. For example, users may notified of the threats (at 216). In one example, a browser retrieves potential threats from a database, and warns users when they are loading content from a source at which a potential threat was discovered. However, the subject matter herein is not limited to the example in which users are notified of threats through a browser. Users may be notified of threats in any manner.

Additionally, when threats have been discovered, remedial action may be taken (at 218). There are many possible forms of remedial action, and the following are some example. In one example, a user's browser may block the user from loading content from a site from which a threat has been known or attempted. In another example, the particular mechanism of the attempted attack could be defeated. For example, if a failed attack appears to have attempted to overflow a buffer, then software could be installed that monitors that buffer to prevent overflows. In another example, if an attack appears to have been mounted through a particular program (e.g., the Flash plug-in), then that program could be disabled in order to thwart the attack. Or, if the attack was attempted through a program to which an update has since been released, it could be suggested to a user that he or she install a more recent version of the software, which may have additional security features that resist the type of attack that has been detected.

An additional action that may be taken is to notify an entity of threats that appear to be using that entity's products as an attack vector (at 220). For example, if an operating system manufacturer receives crash data suggesting that a particular program (e.g., the Flash plug-in) is being exploited to mount an attack, then the maker of that plug-in could be notified of the existence and nature of the attempted attack. The maker of the program could then release an update that resists the type of attack that is being attempted, and may be able to release that update before the attack becomes successful. Or, as another example, if good.example.com is hosting an ad from ad.example.com, which is hosting a drive-by attack on bad.example.com, then the owners/operators of good.example.com and ad.example.com could be notified that they are (probably unwittingly) participating in an attack that comes from bad.example.com, so these entities can take appropriate remedial action.

Figure 3:
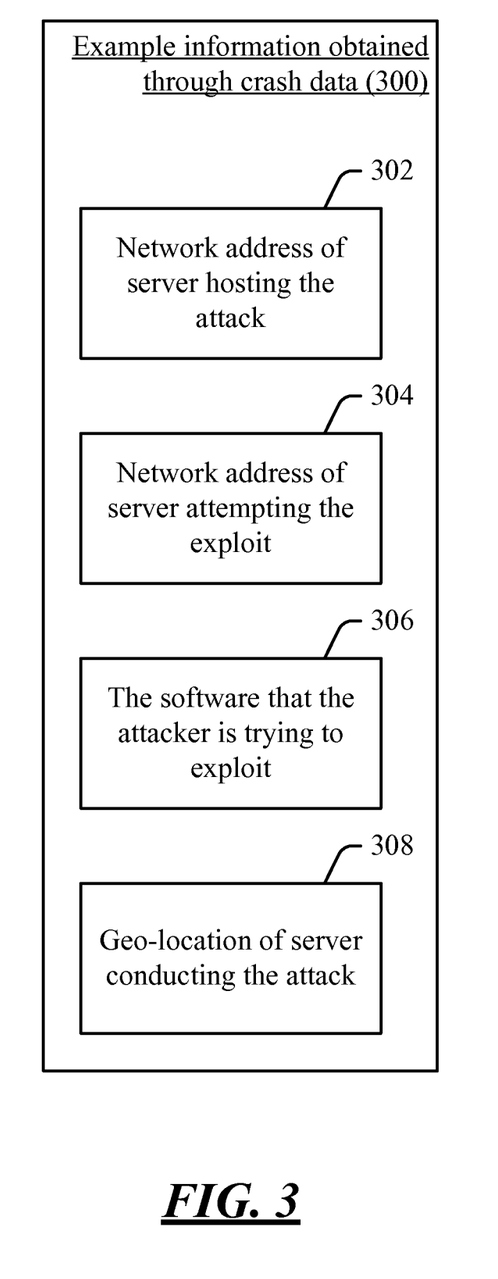
FIG. 3 is a block diagram of some example information that may be obtained through crash data.

FIG. 3 shows some example information that may be obtained through crash data (block 300). One example of the information that may be obtained is the network address of the server that is hosting an attack (block 302). That server may be identified by its Uniform Resource Locator (URL), its Internet Protocol (IP) address, or by any other type of address.

Another example type of information that may be obtained from crash data is the network address of the server that is attempting an exploit (block 304). The server that is attempting the exploit may be different from the server that hosts the attack. For example, as noted above, a legitimate web site may inadvertently become the host of an attack through third-party advertisements. A third-party advertisement is typically hosted by a server different from the one that hosts the web page on which the ad is placed. In this sense, the site where the malicious content is encountered may be distinct from the site where the malicious content is provided. Thus, it may be of interest to know both of these sites.

Another example of information that may be obtained from crash data is the identity of the software that the attacker is trying to exploit (block 306). For example, the attack may cause a crash of a browser, but the software that is being exploited might be a browser plug-in rather than the browser itself. This fact may be learned from the crash data.

Yet another example of information that may be obtained from crash data is the geographic location of the server that is conducting the attack (block 308). Many attackers use different domain names and/or machines to hide their identities. However, if similar attacks are being attempted from the same part of the world, this fact may suggest that attacks that come from different domains or machines are actually originating with the same attacker. This information may help to understand future activity originating in that part of the world, or possibly to identify the person or organization behind the attack.

Figure 4:
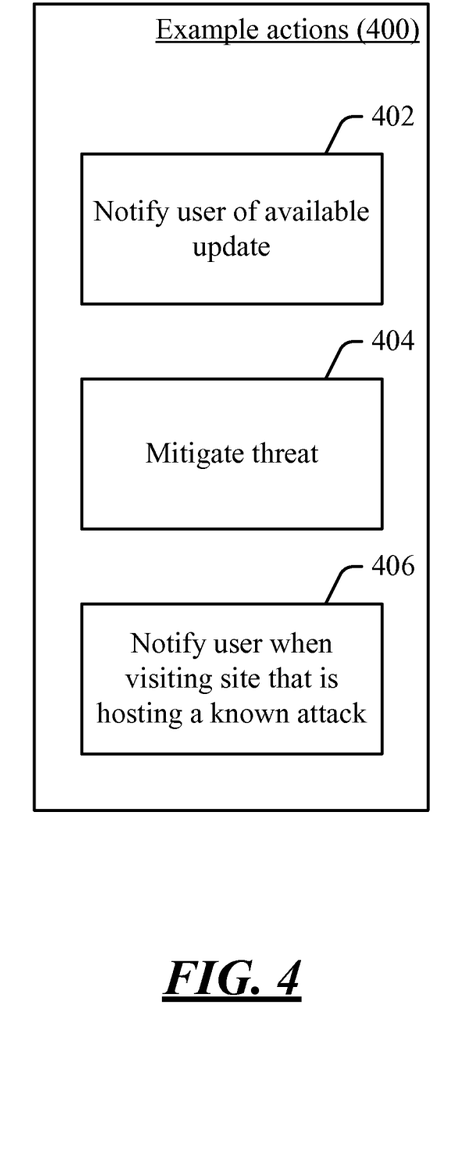
FIG. 4 is a block diagram of various example actions that may be taken when a potential threat is discovered.

FIG. 4 shows various example actions 400 that may be taken when a potential threat is discovered. One such example action is to notify the user of an available update (block 402). For example if an attacker appears to be trying to exploit a vulnerability in a browser plug-in and there is an updated, more secure version of that plug-in, then a user can be notified that an updated version of the plug-in is available.

Another example action is to directly mitigate the threat (block 404). For example, if an attacker appears to be trying to overflow a buffer, then software can be installed that monitors the buffer in order to prevent overflows. As another example, if an attacker appears to be trying to exploit a vulnerability in a particular program such as a browser plug-in, then the plug-in (or other exploited program) can be disabled.

Yet another example of an action that could be taken is to notify a user when that user attempts to visit a site that is hosting a known attack (block 406). For example, suppose that a browser crashes while a user is visiting a site, and analysis of the crash data reveals that the site was attempting to mount an attack. If the threat from this potential attack has not yet been mitigated (or cannot be mitigated), the user can still be warned of the danger of visiting the site, and can be dissuaded from visiting that site. Thus, the identity of the site can be put in a threat database that the browser uses, and the browser can warn the user when visiting that site.

Figure 5:
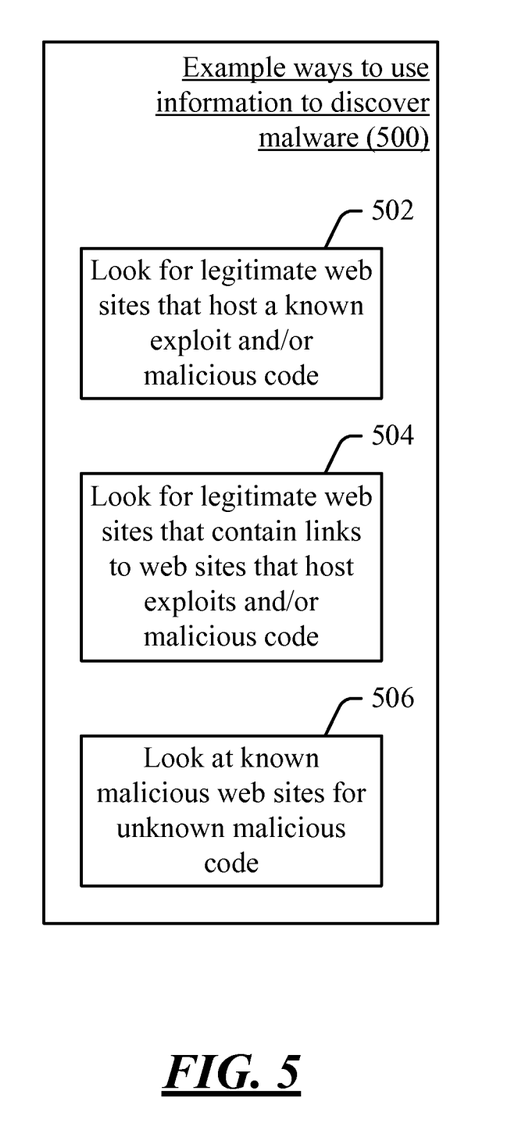
FIG. 5 is a block diagram of some example ways to use information about an attempted attack.

When analysis of crash data reveals an attempted attack, there are various ways to use the information about the attempted attack. FIG. 5 shows some examples of these ways 500.

One example way to use information about an attempted attack is to look for legitimate web sites that attempt to host the discovered attack (block 502). For example, once the nature of the attack is discovered through the crash data, a crawler can examine other web sites to determine whether the same attack (or a similar attack) is being hosted on other web sites.

Another example way to use information about an attempted attack is to look for legitimate web sites that link to web sites that are hosting the attempted attack or a similar attack (block 504). When it is known that a particular site is hosting an attempted attack, it is possible that other sites are linking to that site, and therefore may lead users to the attack. Thus, sites with such links can be discovered, and—when the sites are discovered—remedial action may be taken. For example, the owner of the site may be warned that his or her site is pointing to a potentially unsafe site. Or, users who visit sites with links to unsafe sites may be warned to avoid visiting those sites.

Yet another example way to use information about an attempted attack is to look at known malicious web sites for unknown malicious code (block 506). For example, suppose that the web site at bad.example.com is known to be the launching point for an attempted attack. It may be reasonable to assume that the attempted attack that is discovered is not the only one that is being attempted or carried out from that site. Thus, once bad.example.com is known to be the launching point of an attempted attack, it may make sense to look at that site to determine what other (possibly unknown) attacks are also being launched from that site, or from related sites.

Another example type of information that may be obtained from crash data is the network address of malicious sites hosting the attack code and malware. Analysis of DNS registration information for these sites can often point to a common link that will lead investigators to other similarly malicious sites. The plurality of these sites can be could be used in crash analysis to proactively download the malware for the purposes of developing anti-virus signatures. Additionally, the locations could be added to malware location block lists used by security programs at the desktop or firewall/proxy layer in the network.

Figure 6:
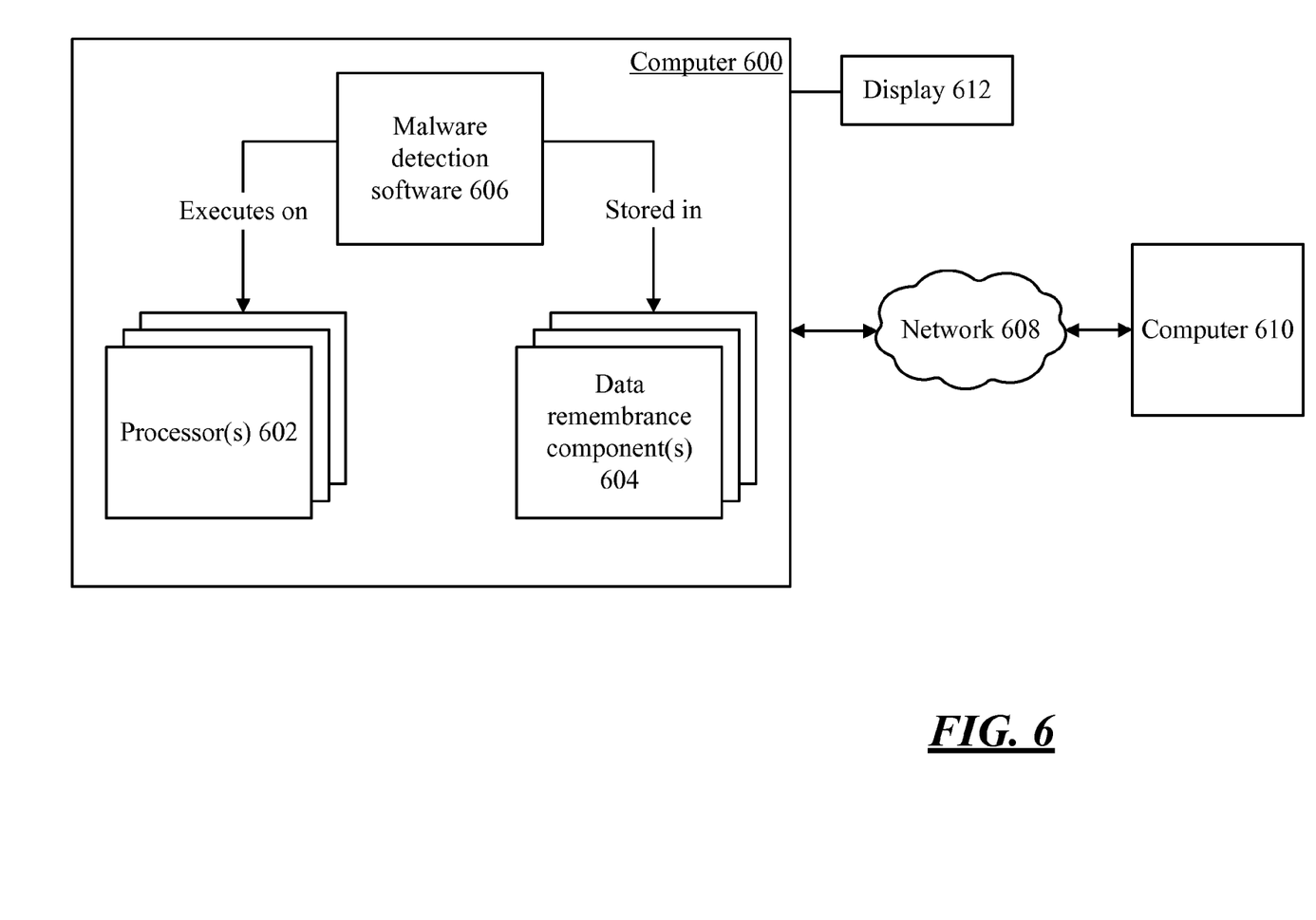
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is malware detection software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories that store executable instructions to detect potential threats, wherein the instructions, when executed by a computer, cause the computer to perform acts comprising:
receiving, from a machine, crash data concerning a program that has crashed on said machine, said program having received content from a content provider, said content hosting an advertisement provided by an advertisement provider, said advertisement provider being distinct from said content provider;
analyzing said crash data to identify a nature of an attempted attack that caused said program to crash, said analyzing determining that said attempted attack is being made through said advertisement; and
using said crash data to take one or more actions, wherein said one or more actions either notify a user of a potential threat, notify a software manufacturer of a potential exploit of the manufacturer's software, or take remedial action to mitigate threats from an attack of the nature that was identified, said one or more actions further notifying said advertisement provider that a customer of said advertisement provider is using said advertisement provider to deliver weaponized advertisements, said one or more actions comprising downloading code that is known to be malware from a site that is discovered through said crash data, and developing an anti-virus signature of said malware.

2. The one or more computer-readable memories of claim 1, wherein said analyzing comprises:
identifying, in said crash data, a network address of a server from which said machine had received data at a time that said program crashed.

3. The one or more computer-readable memories of claim 1, wherein said analyzing comprises:
identifying, in said crash data, a network address of a server that was attempting to exploit a vulnerability in said machine, or in software on said machine, at a time that said program crashed.

4. The one or more computer-readable memories of claim 1, wherein said analyzing comprises:
identifying, in said crash data, an identity of an item of software on which an exploit was being attempted at a time that said program crashed.

5. The one or more computer-readable memories of claim 1, wherein said analyzing comprises:
identifying, based on said crash data, a geographic location of a server that was attempting to exploit a vulnerability in said machine, or in software on said machine, at a time that said program crashed.

6. The one or more computer-readable memories of claim 1, wherein said crash data reveals that an attempt was made to exploit a vulnerability in an item of software, wherein said one or more actions comprise:
in response to said attempt to exploit said vulnerability, notifying said user of an update to said item of software.

7. The one or more computer-readable memories of claim 1, wherein said crash data reveals a mechanism by which an attempt to exploit a vulnerability in an item of software is being made, and wherein said one or more actions comprise:
preventing or monitoring use of said mechanism.

8. A system for detecting potential threats, the system comprising:
a processor;
a data remembrance component;
a crash analysis component that is stored in said data remembrance component and that executes on said processor, wherein said crash analysis component receives crash data from a machine on which a program has crashed, analyzes said crash data to determine a kind of an attack or attempted attack that caused said program to crash, said program having received content from a content provider, said content hosting an advertisement provided by an advertisement provider, said advertisement provider being distinct from said content provider, said crash analysis component determining that said attempted attack is being made through said advertisement;
a notifier that uses analysis of said crash data to notify one or more entities of a solution that resists attacks of said kind, said notifier notifying said advertisement provider that a customer of said advertisement provider is using said advertisement provider to deliver weaponized advertisements; and
a component that downloads code that is known to be malware from a site that is discovered through said crash data, and that develops an anti-virus signature of said malware.

9. The system of claim 8, wherein said solution comprises an update to an item of software that is being exploited in said attempted attack.

10. The system of claim 8, wherein said notifier notifies one of said entities when said entity is attempting to visit a site that has been discovered, through analysis of said crash data, to be hosting said attack or said attempted attack.

11. The system of claim 8, further comprising:
a crawler that crawls known web sites to identify web sites that are hosting an attack or an attempted attack of the kind that was discovered through analysis of said crash data.

12. The system of claim 8, further comprising:
a crawler that crawls web sites to identify web sites that contain links to sites that have been discovered, through analysis of said crash data, to be hosting attacks or attempted attacks.

13. The system of claim 8, further comprising:
a crawler that crawls web sites that have been found, through analysis of said crash data, to be hosting said attack or said attempted attack in order to discover other attacks or attempted attacks hosted by said web sites.

14. The system of claim 8, wherein said crash analysis component identifies, in said crash data, a network address of a server from which said machine received data at a time that said program crashed.

15. The system of claim 8, wherein said crash analysis component identifies, from said crash data, an identity of an item of software that said attack or said attempted attack has exploited or attempted to exploit.

16. A method of detecting a potential threat, the method comprising:
using a computer processor to perform acts comprising:
receiving, from a machine, crash data concerning a program that has crashed on said machine;
analyzing said crash data to identify a kind of attempted attack that caused said program to crash, said program having received content from a content provider, said content hosting an advertisement provided by an advertisement provider, said advertisement provider being distinct from said content provider;
determining from analysis of said crash data that a server is attempting to exploit a vulnerability in an item of software on said machine, said analyzing determining that said attempted attack is being made through said advertisement; and using analysis of said crash data to take one or more actions, wherein said one or more actions either notify a user of a potential threat, notify a software manufacturer of a potential exploit of the manufacturer's software, or take remedial action to mitigate threats from an attack of the kind that was identified, said one or more actions further notifying said advertisement provider that a customer of said advertisement provider is using said advertisement provider to deliver weaponized advertisements, said one or more actions further comprising downloading code that is known to be malware from a site that is discovered through said crash data, and developing an anti-virus signature of said malware.

17. The method of claim 16, wherein said analyzing comprises:

identifying a network address of a server that is attempting to exploit said vulnerability.

18. The method of claim 16, wherein said acts further comprise:

notifying a user of said machine of an update to said item of software that is resistant to attacks of said kind.

19. The method of claim 16, wherein said crash data reveals a mechanism by which an attempt to exploit said vulnerability in said item of software is being made, and wherein said acts further comprise:

preventing or monitoring use of said mechanism.

20. The method of claim 16, wherein said acts further comprise:

crawling web sites to discover which web sites are hosting attacks of said kind, and which web sites contain links to web sites that are hosting attacks of said kind.

* * * * *